Figure 7:
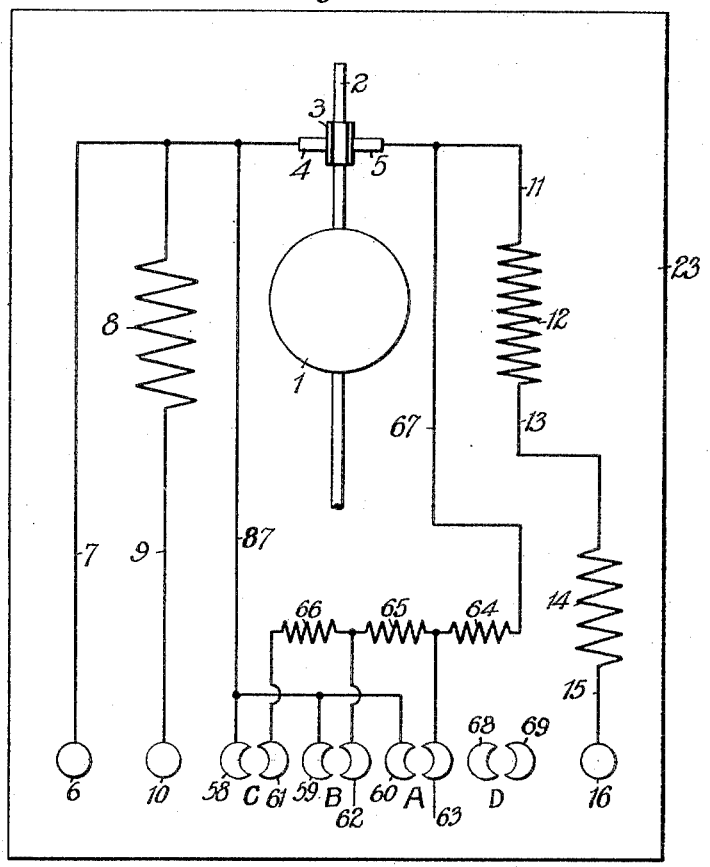

G. A. SCHEEFFER.
ELECTRIC TEST METER.
APPLICATION FILED OCT. 21, 1910.
1,108,401.
Patented Aug. 25, 1914.
2 SHEETS—SHEET 1.
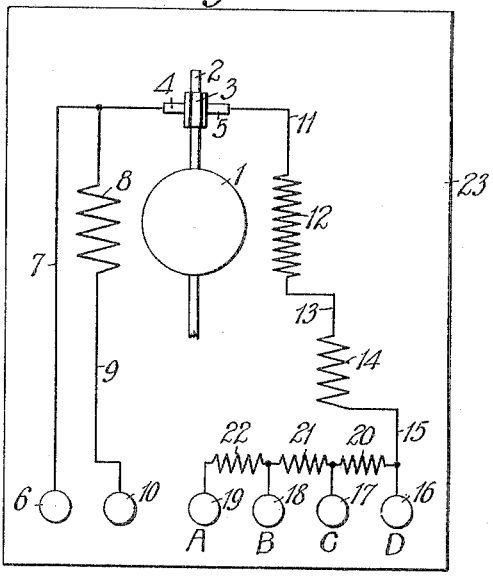
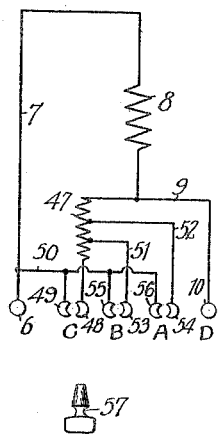
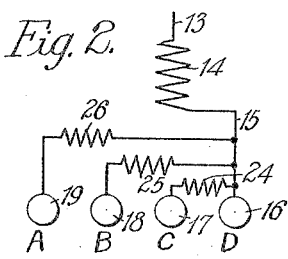
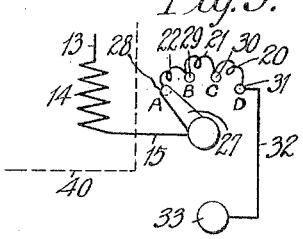
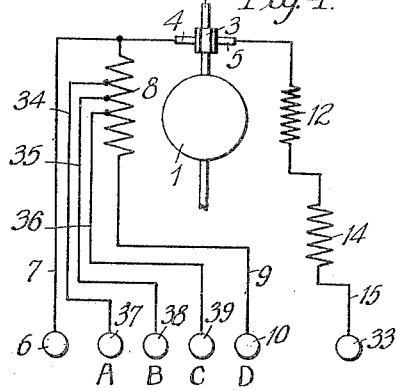
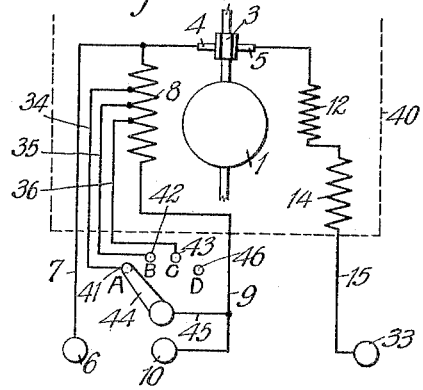
Witnesses:
Leonard W. Novander
Edward T. Dixon
Inventor
Gustave A. Scheeffer
By Brown Wells
Attorneys

G. A. SCHEEFFER.
ELECTRIC TEST METER.
APPLICATION FILED OCT. 21, 1910.

1,108,401.

Patented Aug. 25, 1914.

2 SHEETS—SHEET 2.

Witnesses:
Leonard W. Novander.
George E. Higham.

Inventor
Gustave A. Scheeffer
By Brown Williams
Attorneys

UNITED STATES PATENT OFFICE.

GUSTAVE A. SCHEEFFER, OF INDIANAPOLIS, INDIANA, ASSIGNOR, BY MESNE ASSIGNMENTS, TO ROLLER SMITH CO., OF NEW YORK, N. Y., A CORPORATION OF NEW YORK.

ELECTRIC TEST-METER.

1,108,401. Specification of Letters Patent. Patented Aug. 25, 1914.

Application filed October 21, 1910. Serial No. 588,265.

*To all whom it may concern:*

Be it known that I, GUSTAVE A. SCHEEFFER, a citizen of the United States, residing at Indianapolis, in the county of Marion and State of Indiana, have invented a certain new and Improved Electric Test-Meter, of which the following is a full, clear, concise, and exact description, reference being had to the accompanying drawings, forming a part of this specification.

My invention relates to an improved form of electric test meter adapted to be used without auxiliary apparatus for testing electric meters of different standard makes.

By my invention I provide a plurality of meter terminals which may be provided with proper designations to indicate the make of meter to be connected with each terminal to properly test such meter. The terminals are so connected to the windings of the test meter either by means of proper resistances or by direct connection with the different portions of the meter windings that the rate of operation of the test meter is different for connections effected with the different terminals such rates of operation being proportional or corresponding to the indicated makes of meters to be tested.

As is well known in the art each standard make of electric meters is constructed with certain definite proportions and resistances of windings as a result of which it has a definite rate of rotation for any given voltage and load current, which rate, however, is different from the rates of rotation of other makes for the same values of voltage and load current. As a result by providing the resistances between the terminals of my test meter so that they will produce rates of rotation of the test meter corresponding with the rates of rotation of the meters to be tested, all that is necessary is to properly connect the series winding of the test meter in circuit with the series winding of the meter to be tested and also with the load to be employed and also to connect pressure circuits of the test meter and the meter to be tested to the line extending to the source of current. Care must be taken to properly connect the terminals of the test meter according to the make of meter to be tested and no external shunts or resistances are required. The terminals provided on the test meter for different makes of meters to be tested may be replaced if desired by a single terminal connected with regulating or switch mechanism for establishing conditions of operation of the test meter similar to those above described which conditions may be indicated in connection with the regulating or switching mechanism. It is to be noted that the test meter may be used for any of its operating conditions upon any voltage between the line circuit for which the meter to be tested is adapted to operate, and that no adjustment of the resistances of the test meter is required to compensate for variation in such voltage.

The several drawings illustrating my invention are as follows: Figure 1 is a diagrammatic view of the meter provided with a plurality of resistances connected with the pressure circuit of the meter and extending to a corresponding number of different terminals. Fig. 2 is a diagrammatic view of the terminals of one end of the pressure circuit indicated in Fig. 1, showing a different disposition of the resistance connected with such terminals. Fig. 3 shows in a modified diagrammatic view switching mechanism that may be employed to establish different operative conditions by means of a single terminal for the end of the pressure circuit indicated. Fig. 4 shows in a diagrammatic view similar to Fig. 1, connections of the meter terminals to different points of the series circuit of the meter by which the different operating conditions required may be secured by including more or less of the series field coil in circuit with the load. Fig. 5 shows in a diagrammatic view switching mechanism adapted to secure the results indicated in Fig. 4 with the use of but one terminal at each end of the series circuit of the test meter. Fig. 6 shows, in a diagrammatic view, an arrangement of circuits by which the series field coil of the meter is adapted to be shunted to a greater or less degree by means of a contact plug and coöperating contacts to secure different rates of operation of the meter mechanism. Fig. 7 shows in a view similar to Fig. 1 an arrangement of resistances adapted to shunt the armature circuit as desired to produce rates of operation corresponding to different meters to be tested.

Similar numerals refer to similar parts throughout the several views.

As shown in Figs. 1 and 2, the meter consists essentially of a rotatable armature 1 mounted upon a shaft 2 to which is secured a commutator 3 connected with the windings of the armature. The commutator 3 has bearing thereon brushes 4 and 5. The brush 4 is directly connected with the binding post 6 by wire 7 and is also connected with the series coil 8, the other terminal of which is connected by wire 9 with the binding post 10. The brush 5 is connected by wire 11 with the starting or compensating field coil 12, the other terminal of which is connected by wire 13 with a main resistance 14, the other terminal of which is connected by wire 15 with the binding post 16. Additional binding posts 17, 18 and 19 are associated with the binding post 16 in such a manner that the resistance 20 is included between the binding posts 16 and 17; the resistances 21 between the binding posts 17 and 18, and the resistance 22 between the binding posts 18 and 19. A base 23 is indicated to support the various parts of the meter structure.

The resistances 20, 21 and 22 are so proportioned that when they are included in circuit with the starting coil 12 by connecting to the binding posts 17, 18 and 19 different rates of operation of the meter armature 1 are secured corresponding to the rates of rotation of different standard makes of meters to be tested which may be designated by proper indications in any suitable manner, such indications being made in the construction shown in Figs. 1 and 2 by the letters A, B, C and D; the meaning of these designations being that when testing a commercial meter of make "D" connection is made across the line extending to the source of current by binding posts 6 and 16; when a commercial meter of make "C" is to be tested, connection is made across the line extending to the source of current by binding posts 6 and 17; when a commercial meter of make "B" is to be tested connection is made across the line extending to the source of current by means of binding posts 6 and 18; and when a commercial meter of make "A" is to be tested connection is made across the line extending to the source of current by means of binding posts 6 and 19. In any of the cases referred to above the binding posts 6 and 10 are connected in series with one line wire, the load and the series winding or windings of the meter being tested.

In the modified arrangement shown in Fig. 2 the resistances 24, 25 and 26 corresponding to the resistances 20, 21 and 22 shown in Fig. 1, are connected directly from the posts 17, 18 and 19 respectively to the wire 15. This arrangement provides that any of the resistances 24, 25 and 26 may be changed if necessary to accommodate other makes of meters to be tested without interfering with the remaining resistances.

In the modification shown in Fig. 3 the wire 15 is connected with the pivotal point of a switch arm 27 adapted to engage different contact buttons 28, 29, 30 and 31 between which the resistances 20, 21 and 22 are connected. The button 31 is connected by wire 32 with a binding post 33 which constitutes one terminal of the pressure circuit of the meter, the other terminal of which is the binding post 6 shown in Fig. 1. The switch arm 27 and contact buttons engaged thereby may be located preferably outside of the meter casing indicated by the dotted line 40 and supported by the base of the test meter so as to be convenient of access to the operator.

In the modified construction shown in Fig. 4 wire 15 is connected directly to the binding post 33 and the series field coil 8 is provided with a plurality of taps 34, 35 and 36 extending to the binding posts 37, 38 and 39 respectively. The portions of the field coil 8 included between the taps 34, 35 and 36 and the wire 9 are so proportioned that by connecting the load circuit of the meter to the post 6 and one of the posts 37, 38, 39 and 10 various operating conditions of the meter are secured corresponding to commercial makes of meters to be tested, as described above. The several makes of meters to be tested are indicated by the letters A, B, C, D associated with the binding posts 37, 38, 39 and 10. For this arrangement of the meter windings the pressure circuit of the test meter terminating in the binding posts 6 and 33 is connected across the line extending to the source of current, and the series circuit including the series winding of the meter to be tested and the load employed is connected with the post 6 and the one of the posts 37, 38, 39 and 10 indicated by one of the designations associated with the posts which corresponds with the make of meter to be tested.

In the modified arrangement shown in Fig. 5, the connections are similar to those shown in Fig. 4 with the exception that the leads 34, 35 and 36 extend to contact buttons 41, 42 and 43 respectively adapted to be engaged by a switch arm 44, the pivotal point of which is connected by wire 45 with the wire 9. An additional contact button 46 is provided to be engaged by the switch arm 44 when it is desired to include in the series circuit all of the field coil 8. As a result of the arrangement shown in Fig. 5, the switch arm 44 serves to short circuit more or less of the field coil 8 as desired thus serving to establish operating conditions of the meter mechanism corresponding to different makes of meters to be tested indicated by the designations A, B, C and D associated with the buttons 41, 42, 43 and 46 respectively. The switch arm 44 and the contacts engaged thereby may, if desired, be located outside of the meter casing indicated by the dotted line 40 so as to be readily accessible to the operator.

As shown in Fig. 6, the series coil 8 is connected by the wire 9 directly to the binding post 10. The wire 9 has connected to it one terminal of a resistance 47, the other terminal of which is connected to one of a pair of contacts 48, the other contact 49 of which is connected by wire 50 with wire 7. Taps 51 and 52 are taken off from the resistance 47 and connected to contacts 53 and 54, arranged to coöperate respectively with contacts 55 and 56, which are connected to wire 50. Contacts 48 and 49 are so conformed and related to each other as to be engaged by a taper plug 57 of conducting material when such plug is inserted between the contacts. The contacts 53 and 55 are similarly conformed and disposed, as are also the contacts 54 and 56. The series connection of the test meter is made to binding posts 6 and 10, regardless of the operating condition of the meter to be established, and then by inserting the plug 57 between the proper pair of contacts an operating condition corresponding to the meter of manufacture A, B or C may be secured, since by so inserting the plug 57 different amounts of the resistance 47 are included in shunt of the series field coil 8, and thus different operating conditions of the meter are produced, which gives a rate of operation of the test meter corresponding to the rate of operation of the meter being tested for the same amount of current flowing through the series circuits of the two meters. It is to be understood that when a meter of make D is to be tested, the plug 57 is not used, and that no shunt is closed around the series field coil 8.

In the modified arrangement shown in Fig. 7 a wire 87 is connected with the wire 7 and extends to the contacts 58, 59 and 60, which coöperate with contacts 61, 62 and 63, respectively, and are adapted to be engaged by a taper conducting plug 57 in a manner similar to that shown and described in connection with Fig. 6, as a result of which the contacts between which the plug is inserted are electrically connected together. A wire 67 serves to connect the wire 11 with one terminal of the resistance 64, the other terminal of which is connected to one terminal of the resistance 65 and also to the contact 63. The other terminal of the resistance 65 is connected to one terminal of the resistance 66 and also to the contact 62. The other terminal of the resistance 66 is connected to contact 61. As a result of the arrangement of the resistances described when the taper plug 57 is inserted between any pair of contacts a corresponding amount of resistance is included in shunt of the armature brushes 4 and 5, and as a result, the speed of rotation of the armature is changed to correspond with the resistance thus included in circuit. The resistances 64, 65 and 66 are so proportioned that the resulting speed of operation of the meter corresponds with the speed of operation for similar conditions of meters of make A, B and C, respectively, it being assumed in the present illustration that meters of make A operate slower than do meters of make B, while both operate slower than do meters of make C.

While I have shown my invention in the embodiments herein described, I do not, however, limit myself to these exact constructions, but desire to claim any equivalents that may suggest themselves to those skilled in the art.

What I claim is:

1. In an electric test meter, the combination of a rotatable armature, a main series field coil, an auxiliary pressure field coil, a controlling resistance in circuit with the auxiliary field coil, a plurality of binding posts for terminating the pressure circuit of the meter, and fixed resistances between the binding posts to produce rates of rotation of the armature corresponding to different meters to be tested.

2. In an electric test meter, the combination of a rotatable armature, a field coil, a plurality of binding posts for terminating the pressure circuit of the meter, and fixed resistances between the binding posts to produce operating conditions of the armature corresponding to different meters to be tested.

3. In an electric test meter, the combination of a rotatable armature, a field coil, resistances connected with the pressure circuit of the meter for producing operating conditions of the armature corresponding to different meters to be tested, and terminals for such resistances.

4. In an electric test meter, the combination of a rotatable armature, a field coil, a plurality of binding posts for terminating the pressure circuit of the meter, fixed resistances between the binding posts to produce operating conditions of the armature corresponding to different meters to be tested, and devices associated with the binding posts for indicating the corresponding meters to be tested.

5. In an electric test meter, the combination of a rotatable armature, a field coil, resistances connected with the pressure circuit of the meter for producing operating conditions of the armature corresponding to different meters to be tested, terminals for such resistances, and devices associated with the terminals for indicating the meters to be tested corresponding to the different steps.

6. In an electric test meter, the combination of a rotatable armature, a main series field coil, a compensating coil, a controlling resistance in circuit with the compensating coil, and terminals connected with the resistance at points to produce different predetermined testing rates of rotation of the armature.

7. In an electric test meter, the combination of a rotatable armature, a field coil, a controlling resistance, and terminals connected with the resistance at points to produce different predetermined testing rates of rotation of the armature.

8. In an electric test meter, the combination of a rotatable armature, a main series field coil, a compensating coil, a controlling resistance in circuit with the compensating coil, terminals connected with the resistance at points to produce different predetermined testing rates of rotation of the armature, and means associated with the terminals for indicating the corresponding testing rates of rotation.

9. In an electric test meter, the combination of a rotatable armature, a field coil, a controlling resistance, terminals connected with the resistance at points to produce different predetermined testing rates of rotation of the armature, and means associated with the terminals for indicating the corresponding testing rates of rotation.

10. In an electric test meter, the combination of a rotatable armature, a field coil, a plurality of terminals connected with the meter windings to produce different standard testing rates of rotation of the armature, and means associated with the terminals for indicating the different standards of rotation.

11. In an electric test meter, the combination of a rotatable armature, a main series field coil, an auxiliary pressure field coil, a controlling resistance in circuit with the auxiliary field coil, a plurality of binding posts for terminating the pressure circuit of the meter, and fixed resistances between the binding posts to produce different full load speeds of the armature corresponding to those of different meters to be tested.

In witness whereof, I hereunto subscribe my name this 18th day of October, A. D., 1910.

GUSTAVE A. SCHEEFFER.

Witnesses:
 PHOEBE HILL,
 JOHN E. SCOTT.

---

Copies of this patent may be obtained for five cents each, by addressing the "Commissioner of Patents, Washington, D. C."